United States Patent
Edgemond, Jr.

[15] 3,642,311
[45] Feb. 15, 1972

[54] TORQUE-TRANSMITTING JOINT
[72] Inventor: John W. Edgemond, Jr., San Diego, Calif.
[73] Assignee: Gulf Oil Corporation, San Diego, Calif.
[22] Filed: May 9, 1969
[21] Appl. No.: 823,362

[52] U.S. Cl. .................................287/109, 29/516, 29/510
[51] Int. Cl. .......................F16b 7/00, F16d 1/00, F16l 21/00
[58] Field of Search .....................29/516, 517, 510; 287/109

[56] References Cited

UNITED STATES PATENTS

| | | |
|---|---|---|
| 1,329,479 | 2/1920 | Savon.................................287/109 X |
| 1,929,608 | 10/1933 | Rea...................................29/517 UX |
| 3,432,916 | 3/1969 | Fisher et al............................29/416 |

Primary Examiner—Charlie T. Moon
Attorney—Fitch, Even, Tabin & Luedeka

[57] ABSTRACT

A torque-transmitting joint, and a method for producing such a joint, are described. A rotary tube and a rotary shaft are joined by forming the tube over a plurality of teeth of short axial length projecting radially from the shaft.

5 Claims, 3 Drawing Figures

PATENTED FEB 15 1972
3,642,311
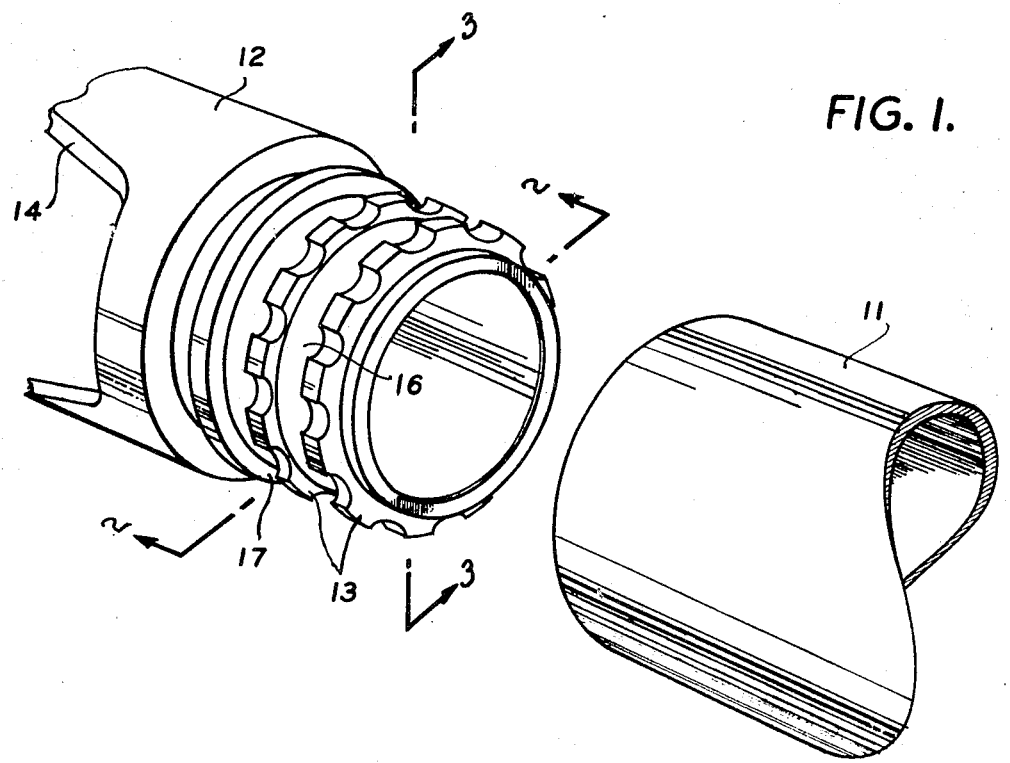
FIG. 1.
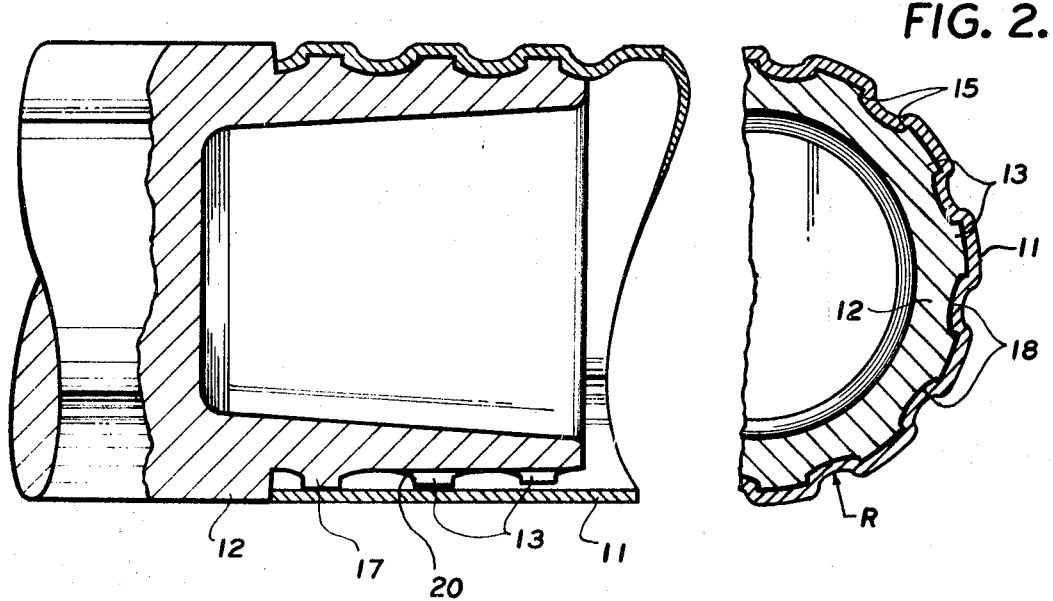
FIG. 2.
FIG. 3.
INVENTOR.
JOHN W. EDGEMOND JR.
BY
Anderson, Luedeka, Fitch, Even, & Tabin
ATTORNEYS

TORQUE-TRANSMITTING JOINT

This invention relates generally to the transmission of torque between two rotary members and, more particularly, to an improved torque-transmitting joint and to a method for producing such a joint between a rotary tube and a rotary shaft.

Various types of mechanical arrangements may require that torque be transmitted between a rotary tube and a rotary shaft, both of which are in axial alignment. For example, in automotive vehicles or vessels, torque is transmitted between a drive line shaft or propeller shaft and a shaft on the yoke body of a universal joint. Typical prior art joints for the transmission of torque between such elements have included various types of splined, welded or keyed couplings joining the two axially aligned rotating shafts.

Although satisfactory under some circumstances, typical torque-transmitting joints of the type previously described may not be capable of transmitting torque of sufficient magnitude without failure or the generation of backlash clearance. A high degree of cost may be encountered in manufacturing joints of the previously described type due to the necessity of accurate machining of a proper fit for a satisfactory torque-transmitting joint.

It is therefore an object of the present invention to provide an improved torque-transmitting joint.

Another object of the invention is to provide a method for producing an improved torque-transmitting joint between a rotary tube and a rotary shaft.

A further object of the invention is to provide a torque-transmitting joint and a method for producing same in which the joint has superior torque-transmitting properties, being substantially free from the likelihood of backlash clearance or failure.

Other objects of the invention will become apparent to those skilled in the art from the following description taken in connection with the accompanying drawings wherein:

FIG. 1 is a perspective exploded view illustrating the configuration of the parts of a torque-transmitting joint constructed in accordance with the invention prior to final forming;

FIG. 2 is a sectional view looking along the axis of the joint after it is formed and taken at a position generally along the line 2—2 of FIG. 1; and FIG. 3 is a half sectional view in a plane through the axis of the joint and taken generally along the line 3—3 of FIG. 1, and also showing one side with the tube in the unformed condition.

Very generally, the torque-transmitting joint comprises a rotary tube 11 and a rotary shaft 12, with the tube having a portion positioned overlapping and coaxial with a portion of the shaft. A plurality of teeth 13 project generally radially from the shaft in the overlapping portion, and at least some of the teeth are spaced axially from each other. The tube is formed over the teeth to produce a plurality of individual pockets in the tube which accommodate the teeth and which are formed to completely surround and engage the teeth on all sides.

Referring now to the drawings, a torque-transmitting joint constructed in accordance with the invention is illustrated. The joint illustrated is for connecting the tubular drive shaft in an automotive drive with a universal joint yoke. A portion of the yoke may be seen in FIG. 1 indicated as 14. The drive shaft of the yoke is hollow and is indicated at 12. It extends from the yoke 14 and has a reduced diameter joint portion 16. The plurality of teeth 13 extend radially from the reduced diameter portion 16. The teeth are disposed in two circumferential rows, each row being spaced axially along the joint portion 16 of the shaft 12. Although it is preferable that at least some of the teeth be spaced axially from each other (e.g., two or more rows), a single row of teeth may provide adequate torque transfer characteristics under some circumstances.

The teeth are made as sharp-edged as possible so that, as will be explained in greater detail below, they bite into the tube wall. The top of the teeth may be flat or slightly curved, depending on how they are formed. The term "generally flat" is intended to include either case. The teeth are generally rectangular in cross section and have the top portions 15 (FIG. 2) of their sidewalls generally perpendicular to the generally flat tops of the teeth, preferably for a distance of about one-half the thickness of the wall of the tube 11. The reason for this will be explained below. The actual depth of the space between each tooth is greater than the straight portions 15 of the sidewalls. The additional depth is equal to the height of the straight wall and consists of an arcuate surface 18 extending between the bottom of the straight sidewall in one tooth to the bottom of the straight sidewall in the next adjacent tooth. The radius (R in FIG. 2) is preferably two to six times the thickness of the wall of the tube 11.

The tube 11 has a portion at one end which overlaps the joint portion 16 of the drive shaft 12 and which is formed against the teeth to create a plurality of individual pockets accommodating respective ones of the teeth. The pockets are formed to completely surround and engage the respective teeth on all sides. This factor, together with the fact that more than one circumferential row of teeth of short axial length are provided, rather than a single row of much longer teeth in the axial direction, provide superior torque-transmitting properties in the joint. The greater the number of short teeth and complete pockets with closed walls entirely surrounding the teeth, the greater the torque transmission capabilities of the joint. Preferably, the tube is formed about the teeth so that the sharp top edges of the teeth bite into the tube wall, thereby avoiding the production of force vectors which will open the pocket and generate backlash clearance or failure. The additional depth provided in the spaces between the teeth provides a passage for rapidly displaced air which would impede metal flow during the forming process if a shallower tooth space were used and might even cause metal rebound and produce a loose joint.

By referring to FIG. 3, the lower side of the Figure illustrates the tube prior to its formation. It may be noted that in the two rows of teeth illustrated, the projection distance of the teeth is less than required to contact the inner surface of the tube 11. This is shown in exaggeration for clarity, and such clearance is provided to allow a free distance of travel or "fly distance" when the tube is formed over the teeth. This improves the forming properties between the tube and the teeth. To ensure concentricity, however, a solid circumferential ring 17 is provided which projects the full distance and contacts the inner surface of the tube. The ring 17 also serves to form a seal in the joint.

Preferably, the forming of the tube 11 over the teeth 13 is accomplished by means of magnetic forming. Apparatus for forming materials by employing varying magnetic fields of high intensity is well known in the art, an example of such apparatus being shown and described in the U.S. Pat. No. 2,976,907, assigned to the assignee of the present invention. In apparatus of this general type, an electric current pulse of high amperage is passed through a coil to provide a desired magnetic field of high intensity. The current pulse may be applied to the coil directly from a current pulse source. A conductive workpiece positioned in the pulsed magnetic field produced by the coil has a current pulse induced in it. This current pulse interacts with the pulsed magnetic field to produce a force acting on the workpiece. If the force is sufficiently strong, a deformation of the workpiece results. The shape of the deformation is dependent upon the distribution, in time and space, of the magnetic field, the position of the workpiece relative to the field, and the shape of any resisting surfaces which the deformed portion comes in contact with. Repeated pulses of current may be applied to the coil, thus causing a series of deforming impulses to act upon the workpiece. The limitation of the length of the straight sidewall of each tooth to about one-half of the tube wall thickness, previously set forth, avoids shearing the tooth through the tube wall, thereby making a hole instead of a pocket as desired.

It is also preferable, to provide sharp teeth and concentricity, that the teeth be formed by a machining operation, rather than by an operation such as forging, casting, upsetting, rolling, or cold-forming. Formation of the teeth, more specifically, may be accomplished by first turning the rough forging to the required axial contours and diameters and required concentricity with the yoke 14. This leaves a plurality of axially spaced circumferential ridges. The spaces or valleys between the teeth may then be punched out or broached out of the ridges with radially displaced punches or cutters set into a guide or holder in a suitable machine. To enable this, a curved contour is provided at 20 between the circumferential ridges from which teeth are formed. This buttresses the ridges to allow the metal to be sheared out without bending down when the tool comes in contact.

Although the illustrated joint involves the forming of the tube 11 in an inward direction onto outwardly projecting teeth in the drive shaft, some joint configurations may provide inwardly projecting teeth from the inner wall of the hollow drive shaft and an expansion of the tube into the teeth. In the latter case, the same considerations hold true as to the sharpness of the teeth, their distribution, etc.

It may therefore be seen that the invention provides an improved torque-transmitting joint and a method for producing such a joint between a rotary tube and a rotary shaft. The joint has torque-transmitting capabilities superior to heretofore known configurations, and is easily manufactured. Moreover, the likelihood of backlash clearance or failure is substantially reduced by the invention. Where the teeth are short axially, e.g., a length (axial) to width (circumferential) ratio of 2 or 3 to 1 maximum, less energy is required to form the joint than with longer teeth. A threefold increase in tooth length increases load capability only a minimal amount and yet doubles the energy required to magnetically form the joint. The shape of the teeth, i.e., the perpendicular sides and the rounded deeper spaces between the teeth, effect a controlled flow of metal during the forming operation to thereby ensure a proper joint will result.

Various modifications of the invention in addition to those shown and described herein will become apparent to those skilled in the art from the foregoing description and the accompanying drawings. Such modifications are intended to fall within the scope of the appendant claims.

I claim:

1. A torque-transmitting drive line joint comprising, a rotary tube having a first joint portion, a rotary shaft having a second joint portion positioned overlapping and coaxial with said first joint portion of said tube, and a plurality of teeth projecting generally radially from said second joint portion of said shaft, said teeth having a generally flat top and having sides generally perpendicular to said top in the region of said sides adjacent said top, said teeth being spaced circumferentially from each other with the spaces therebetween being of greater depth than the perpendicular regions of said sides, said first joint portion of said tube being formed with a plurality of individual pockets therein accommodating respective ones of said teeth and formed to completely surround and engage said respective teeth on all sides, said teeth having top edges of sufficient sharpness as to bite into the engaging surface of said first joint portion.

2. A joint according to claim 1 wherein said teeth are of square or rectangular cross section and are arranged in a plurality of circumferential rows which are spaced axially from each other, wherein each of said teeth has a dimension in the axial direction of at least about twice the thickness of the wall of said tube, wherein each of said teeth has a dimension in the circumferential direction which is no less than one-third of the axial dimension, and wherein said teeth in each row are spaced from each other circumferentially a distance equal to about two to six times the thickness of the wall of said tube.

3. A joint according to claim 1 wherein the sides of each of said teeth are generally perpendicular to a generally flat top for a distance of about one-half the thickness of the wall of said tube, and wherein the spaces between said teeth are of a depth at least about equal to the thickness of the wall of said tube.

4. A joint according to claim 1 including an annular ring surrounding said shaft to form a seal.

5. A torque-transmitting drive line joint comprising, a rotary tube having a first joint portion, a rotary shaft having a second joint portion positioned overlapping and coaxial with said first joint portion of said tube, an annular protuberance formed circumferentially extending around the surface of said second joint portion, said protuberance having a plurality of spaces formed therein to form a plurality of teeth projecting radially from said second joint portion of said shaft, said teeth each being buttressed by an arcuate surface extending from all sides thereof, said teeth having a generally flat top and having sides generally perpendicular to said top in the region of said sides adjacent said top, said teeth being spaced circumferentially from each other with the spaces therebetween being of greater depth than the perpendicular regions of said sides, said first joint portion of said tube being formed with a plurality of individual pockets therein accommodating respective ones of said teeth and formed to completely surround and engage said respective teeth on all sides, said teeth having top edges of sufficient sharpness as to bite into the engaging surface of said first joint portion.

* * * * *